J. WILZ.
Hose-Carriage.

No. 210,284. Patented Nov. 26, 1878.

WITNESSES:
C. Neveux
C. Sedgwick

INVENTOR:
J. Wilz
BY Munn & Co
ATTORNEYS.

UNITED STATES PATENT OFFICE.

JOHN WILZ, OF SANTA CRUZ, CALIFORNIA.

IMPROVEMENT IN HOSE-CARRIAGES.

Specification forming part of Letters Patent No. 210,284, dated November 26, 1878; application filed August 23, 1878.

*To all whom it may concern:*

Be it known that I, JOHN WILZ, of Santa Cruz, in the county of Santa Cruz and State of California, have invented a new and Improved Hose-Cart, of which the following is a specification:

The object of my invention is to construct a hose-cart which may be used to transport hose from place to place, and the motion of the cart availed of for winding or unwinding the hose rapidly without straining the same.

My invention consists in a truck or cart having supporting-wheels, and a drum or reel hung upon a swinging frame that is pivoted to the truck-frame, and may be moved to bring a gear-wheel on the reel-shaft in or out of contact with a gear-wheel attached to the truck-wheel, whereby the reel is turned to wind or unwind the hose, according to the direction in which the cart is moving; or the reel may be secured out of contact when the cart is moving from place to place.

Figure 1:
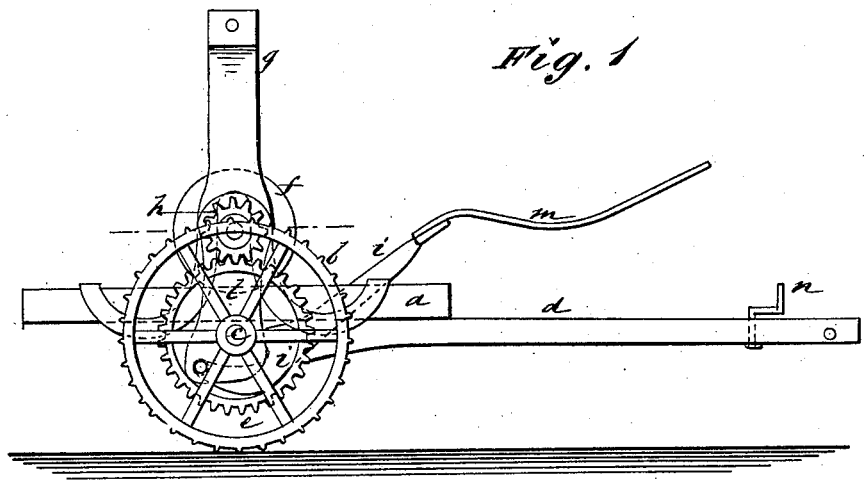
Figure 2:
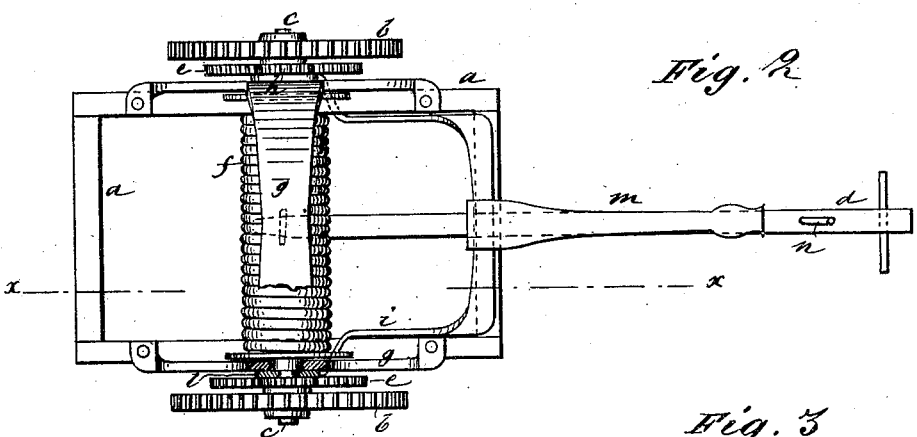
Figure 3:
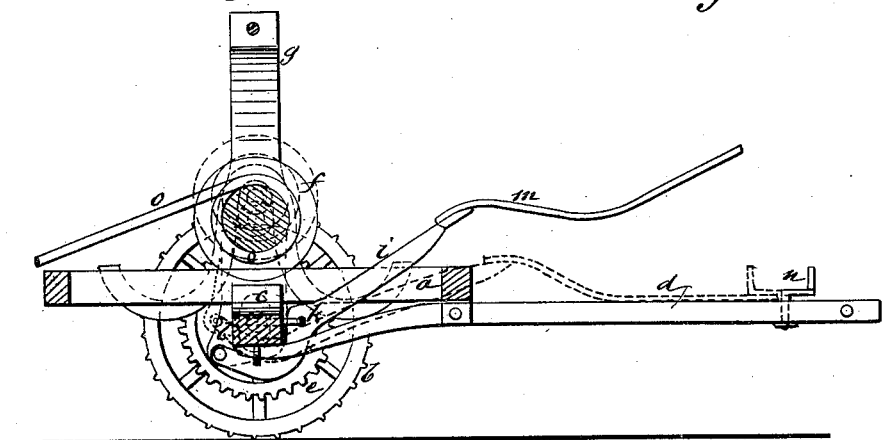

In the accompanying drawing, Figure 1 is a side elevation of my improved hose-cart. Fig. 2 is a plan view of the same; and Fig. 3 is a sectional elevation at the line $x\ x$ of Fig. 2.

Similar letters of reference indicate corresponding parts.

The truck consists of a rectangular frame, $a$, supported on two wheels, $b\ b$, that turn upon journals at the ends of the axle $c$, which axle is bolted to the frame $a$ midway of its length. The periphery of each wheel $b$ is preferably formed with spurs, as shown, to give the wheels a better hold on the ground.

$d$ is a handle, attached to frame $a$ and axle $c$, and extending in front of the cart, so as to be used for drawing the hose-cart.

$e\ e$ are gear-wheels, attached to wheels $b$, one on each wheel, at the inner side thereof.

The trunnions of the hose-reel $f$ pass through elongated slots in an arched brace, $g$, (see Fig. 2,) that passes above the frame $a$ from side to side, and is bolted to the frame $a$. On the end of each trunnion, outside of brace $g$, a small gear-wheel, $h$, is secured.

$i\ i$ are arms, hung by staples $k\ k$ to the axle $c$, near the ends of the axle. $l\ l$ are links, connecting each arm $i$ to the trunnions of hose-reel $f$. The outer ends of arms $i$ are connected together, and extend, in the form of a lever, $m$, out upon the handle $d$. When the lever $m$ rests upon the handle $d$ the reel $f$ is thereby raised, so that the gears $h$ are free from contact with gears $e$, and the lever $m$ may be secured in that position by the turning catch $n$ on handle $d$, as seen by dotted lines.

By releasing lever $m$ and raising the same, as shown in the drawing, the reel is drawn downward, the slots in brace $g$ permitting that movement, and gears $h$ and $e$ mesh together. In this position the hose will be unwound when the cart is drawn forward, or wound upon the reel when the cart runs backward. The hose is shown as wound on reel $f$, and is marked $o$.

The brace $g$ supports the reel $f$ transversely of the frame $a$, and against the strain caused by the winding or unwinding of the hose.

By the construction described, the hose-cart is rendered very convenient for use, and the hose cannot be wound or let off any faster than the movement of the cart will permit. Thereby strain on the hose and dragging of the hose on the ground are avoided.

I do not limit myself to the exact details of construction set forth, as they may be varied without departing from my invention.

Having thus described my invention, I claim as new and desire to secure by Letters Patent—

1. The reel $f$, hung upon the pivoted arms $i$, and having the gears $h$ upon its shaft or trunnions, in combination with the gears $e$, truck-wheels $b$, and truck-frame, substantially as and for the purposes set forth.

2. The combination and arrangement of the reel $f$, brace $g$, arms $i$, lever $m$, links $l$, and gears $e\ h$ with the truck-frame $a$, substantially as and for the purposes set forth.

JOHN WILZ.

Witnesses:
 JACKSON SYLVAR,
 GREEN MAJORS.